United States Patent
Nies et al.

(10) Patent No.: US 8,226,354 B2
(45) Date of Patent: Jul. 24, 2012

(54) MAGNETOSTRICTIVE MEASUREMENT OF TENSILE STRESS IN FOUNDATIONS

(75) Inventors: Jacob Johannes Nies, Zwolle (NL); Jan Erich Hemmelmann, Munich (DE); Christof Martin Sihler, Hallbergmoos (DE)

(73) Assignee: General Electric Company, Schenectady, NY (US)

( * ) Notice: Subject to any disclaimer, the term of this patent is extended or adjusted under 35 U.S.C. 154(b) by 1244 days.

(21) Appl. No.: 11/964,196

(22) Filed: Dec. 26, 2007

(65) Prior Publication Data

US 2009/0169380 A1 Jul. 2, 2009

(51) Int. Cl.
*F03D 11/00* (2006.01)
(52) U.S. Cl. ........................................ 415/118
(58) Field of Classification Search ............... 415/118; 416/DIG. 6
See application file for complete search history.

(56) References Cited

U.S. PATENT DOCUMENTS

| | | | | |
|---|---|---|---|---|
| 5,280,725 A | * | 1/1994 | Stengel | 73/761 |
| 5,437,197 A | * | 8/1995 | Uras et al. | 73/862.69 |
| 5,505,033 A | * | 4/1996 | Matsuo et al. | 52/296 |
| 6,622,577 B1 | * | 9/2003 | Uras | 73/862.69 |
| 6,672,023 B2 | | 1/2004 | Henderson | |
| 7,059,822 B2 | * | 6/2006 | LeMieux et al. | 415/4.3 |
| 7,155,875 B2 | | 1/2007 | Henderson | |
| 7,458,276 B2 | | 12/2008 | Mizuno et al. | |
| 7,805,895 B2 | * | 10/2010 | Kristensen | 52/169.9 |
| 7,900,406 B2 | * | 3/2011 | Wobben | 52/126.1 |
| 7,967,564 B1 | * | 6/2011 | Andersen et al. | 416/1 |
| 8,037,646 B2 | * | 10/2011 | Wobben | 52/126.3 |
| 2009/0068014 A1 | * | 3/2009 | Enevoldsen et al. | 416/61 |

FOREIGN PATENT DOCUMENTS

| | | |
|---|---|---|
| CN | 1715849 A | 1/2006 |
| JP | 2007-155475 A2 | 6/2007 |
| JP | 2007155475 * | 6/2007 |
| WO | WO 2006/013089 A1 | 2/2006 |
| WO | WO 2006/013093 * | 2/2006 |

OTHER PUBLICATIONS

European search report, EP 08170928, Nov. 11, 2009.*
Chinese Office Action issued.

* cited by examiner

*Primary Examiner* — Nathaniel Wiehe
(74) *Attorney, Agent, or Firm* — Global Patent Operation; Douglas D. Zhang (57) ABSTRACT

A foundation for supporting a structure is provided. The foundation includes a foundation body, at least one anchor bolt connecting a lower anchor plate and the structure, a magnetostrictive load measuring sensor for measuring loads on the at least one anchor bolt, the magnetostrictive load measuring sensor being positioned within the foundation body.

20 Claims, 5 Drawing Sheets

MAGNETOSTRICTIVE MEASUREMENT OF TENSILE STRESS IN FOUNDATIONS

BACKGROUND OF THE INVENTION

The present invention relates to foundations and, in particular, reinforced concrete foundations like concrete pier foundations for support of tall, heavy or large structures like towers. Further, the present invention relates methods of measuring tensile stress in a foundation. More particularly, it relates to foundations for a wind turbine and a method for measuring tensile stress in a foundation component. Specifically, it relates to a foundation for supporting a structure, a wind turbine and a method for measuring tensile stress in a foundation.

To optimize foundations for structures, e.g. towers and the like, which may be used to support power lines, communication systems, street lighting and street signals, bridge supports, commercial science, freeway signs, ski lifts, and wind turbines, a measurement of loads in the reinforcement bolts that are contained in the concrete foundation is desirable. Load measurements in the foundation can be used to optimize the foundation with regard to weight and size and can be used to assess fatigue due to operation of the structure.

Large foundations often require a large amount of reinforcing steel and a large amount of concrete to encase the reinforcing steel. Such foundations can be subject to very high compressive and tensile forces. Thereby, upset forces may also be applied at the foundation. Conventionally, the bolts, which are connected to an anchor plate, are tightened to a nominal torque value. The nominal torque value can, for example, be measured at a bolt nut. In light of friction and other manufacturing aspects this method might not provide the desired accuracy. For example, the bolt previous status cannot be measured once the bolt is tightened. Load measurements are difficult to perform, in particular since many of the structural components cannot be accessed as they are embedded in concrete or the like. A measurement of the tensile stress of the bolts can be conducted by ultrasonic measurement of the length of the bolts and a resonant frequency shift due to the tension state, and friction measurements at the bolt nut with special friction nuts. However, these methods can only be performed off-line. Similar aspects apply to components of the structure supported by the foundation.

BRIEF DESCRIPTION OF THE INVENTION

In view of the above, a foundation according to independent claim 1, foundations according to independent claims 11 and 13 and a method for measuring tensile stress in a foundation anchor bolt according to independent claim 16 are provided.

Further aspects, advantages and features of the present invention are apparent from the dependent claims, the description and the accompanying drawings.

According to a first embodiment, a foundation for supporting a structure is provided. The foundation includes a foundation body, at least one anchor bolt connecting a lower anchor plate and the structure, a magnetostrictive load measuring sensor for measuring loads on the at least one anchor bolt, the magnetostrictive load measuring sensor being positioned within the foundation body.

According to another embodiment a wind turbine is provided. The wind turbine includes a foundation body, at least one anchor bolt connecting a lower anchor plate and the structure, a magnetostrictive load measuring sensor for measuring loads on the at least one anchor bolt, the magnetostrictive load measuring sensor being positioned within the foundation body, and a tower supported by the foundation.

According to yet another embodiment, a wind turbine is provided. The wind turbine includes at least one structural component of the group consisting of: a tower, a nacelle supported by the tower, a hub connected to the nacelle, and at least one rotor blade connected to the hub, wherein at least one magnetically encoded steel rod is connected to the at least one of the structural components, wherein the at least one magnetically encoded steel rod is fixedly connected to a first position of the at least one structural component and a second position of the at least one structural component, and a magnetic field sensor positioned adjacent to the at least one magnetically encoded steel rod.

According to an even further embodiment, a method for measuring tensile stress in a foundation anchor bolt is provided. The method includes embedding a magnetostrictive load sensor in the foundation, providing a plug for external access to the signal wiring of the magnetostrictive load sensor, connecting a measuring electronics to the plug, and measuring the tensile stress of the anchor bolt.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Generally, within concrete pier foundations the concrete bears compressive loads. Tensile loads can be borne by reinforcement bars contained in the foundation. Anchor bolts are typically used for attaching the supported structure to the foundation. The anchor bolts can be placed within the reinforcing steel matrix or a reinforcing steel cage. Thereby, it is for example possible to use a removable template at the top and a separate anchor plate at the bottom of each bolt in order to prevent anchor bolts being pulled out. The entire module can be poured in concrete. When the foundation supports the structure like a tower, varying tensile and compressive loads act on the foundation. Tensile loads, which may occur from a tilting force or overturning force on the supported structure, is applied near the top of the foundation by the anchor bolts and acts on large portions of the foundations below the point of application to the anchor plate. Thereby, the tensile and compressive loads in the foundation have a boundary near the bolt anchor plates where the loading on the concrete alternates from a compressive load to a tensile load in dependence of the forces of the supported structure.

Figure 1:
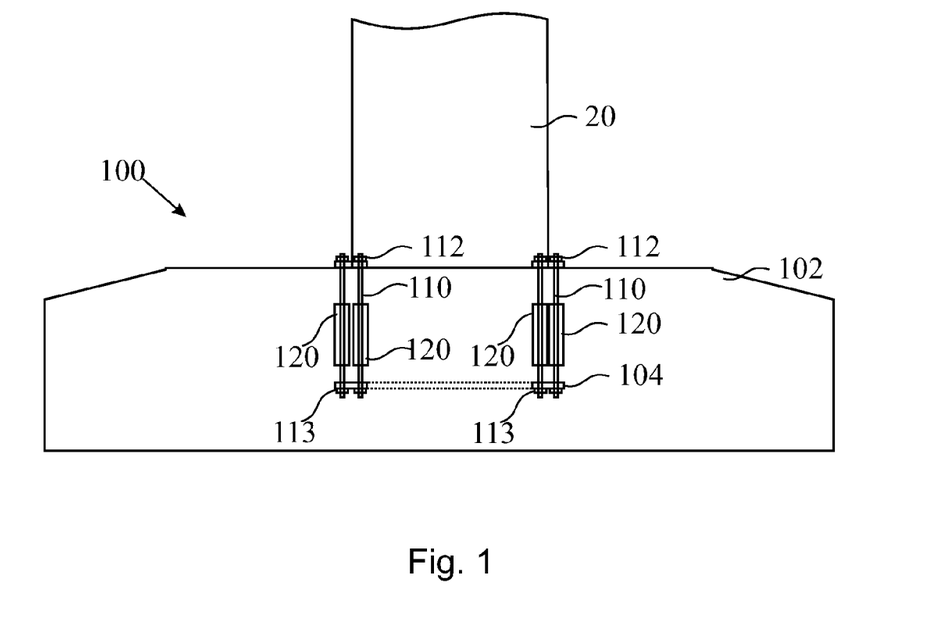
FIG. 1 shows a schematic side view of a foundation having anchor bolts and anchor bolt tensile stress measuring equipment according to embodiments described herein.

FIG. 1 illustrates embodiments of a foundation 100 supporting a structure 20. FIG. 1 shows the lower section of the structure 20, which can, for example, be a lower section of the tower of a wind turbine or the lower section of any other tower. The foundation 100 includes a foundation body 102. According to different embodiments, the foundation body 102 may include one or more sections made of, for example, concrete and reinforcing bars (re-bars) or reinforcing cages which are installed in the foundation body 102.

Extensive labor can be required to assemble or pre-assemble the reinforcing steel matrix and fill the volume of the foundation with concrete or the like. Further, the typical cylindrical foundation requires the use of a drill to provide the hole for the foundation. Accordingly, there is a desire to reduce the amount of the materials in the foundation within such a range that the foundation still provides sufficient stability and operation safety for the supported structure under operation.

FIG. 1 shows an anchor plate 104 that is embedded in the foundation body 102. Anchor bolts 110 are fixed to the anchor plate 104 and extend from the anchor plate to the upper part of the foundation 100. The structure 20 is also fixed to the anchor bolts 110. Thereby a connection between the structure 20 and the anchor plate 104 is provided.

The anchor bolts 110 can also be referred to as tensioning bolts or reinforcing bolts. According to typical embodiments, which can be combined with other embodiments described herein, the anchor bolts can typically be provided in side-by-side pairs which are spaced radially from the center of the foundation. According to further embodiments, an inner ring of anchor bolts can have a slightly smaller diameter than an outer ring of anchor bolts. For example, 18 inner anchor bolts and 18 outer anchor bolts, that is, a total of 36 anchor bolts can be provided in the ring-like shape. According to other embodiments, more than 36 anchor bolts, e.g., a total of 72 or even 96 anchor bolts can be provided. According to yet different embodiments, the rings of bolts can have diameters which are several centimeters apart.

The lower ends of the bolts 110 are anchored to the anchor plate 104, which can be an embedded ring, by threading the anchor bolts through nuts 113. The upper portion of the anchor bolts 110 can be fixed by nuts 112 threaded on the anchor bolts.

When mounting a first, lower portion of the structure 20 to the foundation, the anchor bolts 110 are tensioned by tightening the nuts 112. Thereby pre-tension loads are applied in order to press the structure 20 to the foundation 100. These pre-tension loads on the anchor bolts 110 are not equal to the loads which might occur during operation of the supported structure or the loads which might occur due to the building up of the entire structure 20.

The pre-tension load has to be provided at a desired value. Further, the pre-tension load may vary over time if the foundation has not been perfectly manufactured or the concrete of the foundation starts to interact with the anchor bolts 110. In order to provide the desired pre-tension load values for the anchor bolts it is desirable to monitor the tensile stress in the anchor bolts 110 during tightening of, e.g., the nuts 112. A sensing method for measuring the tensile stress in the anchor bolts (tensioning bolts or reinforcing bolts) that are contained in the concrete foundation body can be conducted by load measuring sensors 120. Thereby, for example, a time-wise stable measurement can be provided.

According to some embodiments, which can be combined with other embodiments described herein, the load measuring sensors 120 provide a measurement equipment based on the magnetostrictive effect. Thereby, a tensile stress measurement can be applied without having to access the anchor bolts 110. Accordingly, a measurement can be provided with high stability over time.

According to embodiments described herein, which can be combined with other embodiments described herein, a bolt of a ferromagnetic material or a rod of a ferromagnetic material can be encoded such that the material has permanent magnetically encoded regions, which can be sensed with a magnetic field sensor. According to different embodiments, the magnetic field sensor may include one or more passive sensing elements, e.g., coils, giant-magnetoresistive sensor, magneto-optical sensors, flux-gate sensors or fiber-optic sensors that are placed in close proximity to the encoded ferromagnetic object. For example, for embodiments described herein, the magnetic field sensor can be placed within a distance to the bolt or the rod of 0.0 mm to 10 mm, e.g. less than 7 mm. Thereby, according to different embodiments, the distance is adapted to be substantially at a constant value over time, e.g. with a deviation of 0.3 mm or below. Further, in the event of a direct contact measurement an electrically isolation sheet might be provided between the bold or rod and the magnetic field sensor.

Figure 2:
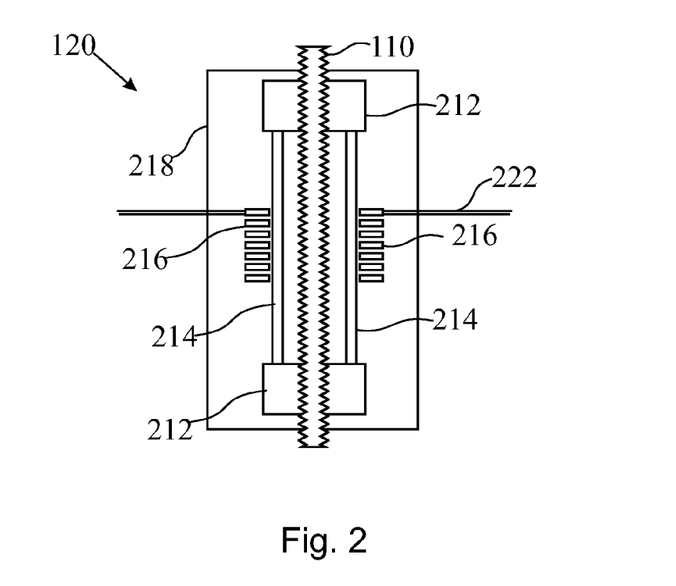
FIG. 2 shows a schematic diagram of a load measuring sensor for measuring tensile stress in an anchor bolt according to embodiments described herein.

As shown in FIG. 2, according to some embodiments, the magnetostrictive load measurement sensor 120 can include first and second nuts 212 which are provided on the anchor bolt 110. The nuts are provided at fixed positions. Magnetically encoded steel rods 214 made of, for example, ferrite steel are provided between the nuts 212. Since the nuts 212 are provided at a fixed first position and a fixed second position on the anchor bolt 110 an elongation of the anchor bolt 110 transfers to the magnetically encoded steel rods 214. In light of the magnetic encoding the tensile stress of the steel rods 214 can be measured with the magnetic field sensors 216. Accordingly, a tensile and/or compressive load on the anchor bolt 110 can be measured with the load measuring sensor 120.

According to some embodiments, which can be combined with other embodiments described herein multiple magnetic field sensors can be used at one rod or bolt. This can enable to perform differential measurements. As an example, one way of performing the differential measurement can be to compare the measured magnetic field from a sensor above a magnetically encoded section of the steel rod with the measured magnetic field from a in a magnetically encoded section of the steel rod. Multiple magnetic field sensors may also enable improved reliability for a situation in which a single sensor fails over time.

With the embodiments described herein, a tensile stress of the anchor bolts can be continuously or regularly monitored during tightening of the nuts 112, manufacturing of the structure 20 and/or operation of the structure 20, e.g., a wind turbine. In light of embodiments described herein, this is possible even though only limited direct access would be generally given to the anchor bolts 110 (only from top) as soon as the foundation 100 has been manufactured by, for example, pouring concrete in the foundation body.

Embodiments described herein further allow measuring of a tensioning state without excessive drift of the measurement signal, because a magnetic encoding of, for example, the steel rod 214 is conducted once before installation of the sensor and maintains at the same encoded state having the same encoded regions during the future operation.

FIG. 2 illustrates embodiments of magnetostrictive load measuring sensors 124 wherein at least two magnetically encoded rods are positioned to extend in the direction of the length of the anchor bolts 110. Thereby, it is possible to measure a tensile stress of the anchor bolt, which corresponds to a tension in both of the encoded rods shown in FIG. 2. According to other embodiments, it can also be possible to measure a bending moment of the anchor bolt 110. Thereby, a bending moment would correspond to different tensile stress values in the respective encoded rods 214 shown in FIG. 2. According to yet further embodiments, it might also be possible to provide load measuring sensors 120, which include only one magnetically encoded rod, whereby only a reduced load information, i.e. tensile stress, can be obtained. According to yet further embodiments, three, four or more steel rods can be provided around the anchor bolt 110. Thereby, for example, a bending moment in two directions, typically perpendicular to each other, can be additionally measured.

According to typical embodiments described herein, an anchor bolt 110 of a foundation can have a length in a range of 1 m to 3 m, for example 2m. Generally, it is according to some embodiments possible to magnetically encode the anchor bolt 110 itself and provide magnetic field sensors directly adjacent, that is, in close proximity to the anchor bolt 110. By providing different magnetic field sensors at different positions along the anchor bolt, different loads like stress or bending moments can be measured. The magnetic field sensors can, according to some embodiments, be firmly attached to the magnetically encoded rod or bolt.

However, since a ferromagnetic material is required for encoding the bolt or the rod, it might be difficult to provide the entire anchor bolt of the desired material. Accordingly, as described above with respect to FIG. 2, providing magnetically encoded rods 214 to which the loads of the anchor bolt 110 is transferred, can reduce the amount of the ferromagnetic material required. Thereby, it is possible to choose the material of the anchor bolt irrespective of the sensing method. Thereby, as a further option, it is possible that two or more, typically all magnetically encoded rods can have the same material, design, (compact) size, even for different wind turbine sizes, and/or the magnetic field sensor could always be attached directly to the rod surface, in the same way. This can result in mass production and, thus, in low manufacturing costs as a calibration on site can be omitted or at least significantly reduced.

According to some embodiments, which can be combined with other embodiments described herein, the magnetically encoded rod 214 can have a length of 1 cm to 10 cm, typically 3 or 5 cm. The magnetically encoded rod does not necessarily need to extend along the entire length of the anchor bolt since the load measuring sensor can provide an elongation or tensile stress per unit length. According to yet further embodiments, the use of a magnetically encoded rod additional to the anchor bolt allows for specific selection of the ferromagnetic material, which might improve and/or simplify the magnetic encoding. This can result in a further decrease of costs for the measurement system.

According to further embodiments, which can be combined with other embodiments described herein, an encapsulation or housing 218 is provided for the load measuring sensor 120 (see FIG. 2). Typically the housing 218 can be provided in form of a sleeve, which might be of a soft material like rubber or foam. A soft sleeve allows some movement of the load measuring unit 120 relative to the foundation body 102 such that an elongation or movement of the anchor bolt 110 is not hindered by the load measuring sensor 120. The wires 222 connected to the magnetic field sensor, which can for example be provided by passive elements like coils, extend out of the housing 218. Thereby, the sensor signal processing is activated when measurements are being performed, i.e., when an external plug (with power supply) is connected.

Figure 3:
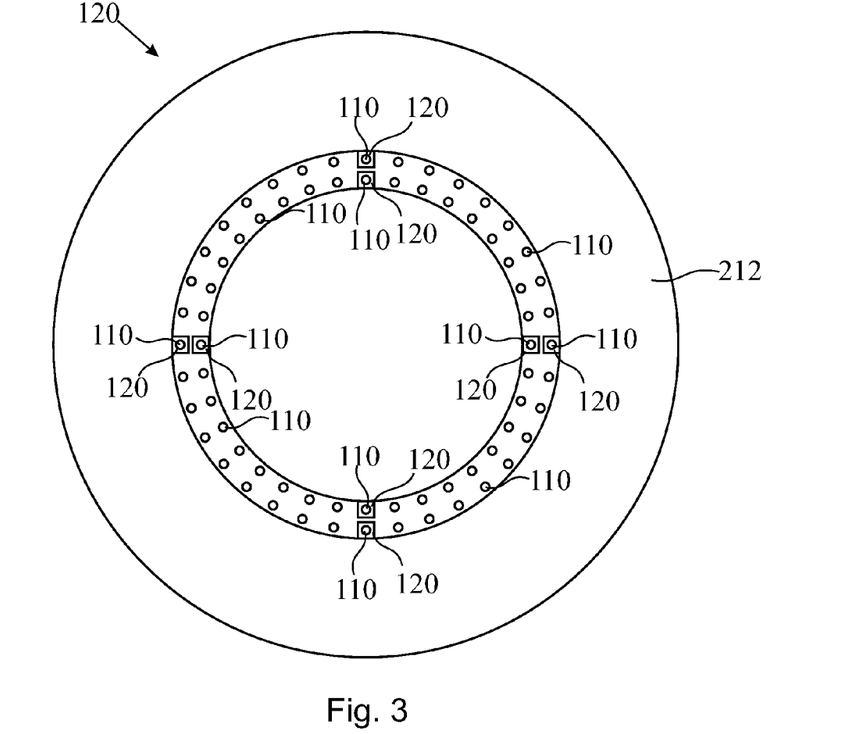
FIG. 3 shows a schematic top view of a foundation having anchor bolts and anchor bolt tensile stress measuring equipment according to embodiments described herein.

FIG. 3 shows a round foundation 100 having a foundation body 102. The anchor plate, which is shown in FIG. 3, is embedded with in the foundation body 102 and is covered by concrete or the like, when the foundation is viewed from above. As shown in FIG. 3, according to some embodiments, the anchor bolts 110 at the 12 o'clock position, the 3 o'clock position, the 6 o'clock position and the 9 o'clock position are each provided with a load measuring sensor 120 at the inner and outer ring of the anchor bolts 110. Thereby, two of the four positions oppose each other, respectively, and can, for example, be located at the north, east, south, and west position of the foundation 100.

If a structure like a wind turbine is positioned on a foundation, a tilting or upset moment might be applied from the structure at the foundation. This can, for example, occur based on operation conditions, the center of gravity of the structure and/or wind or other environmental influences on the structure. These upset moments can result in different loads at each of the four positions of the foundation. Accordingly, by measuring the loads at four different positions, the loads provided by the structure can be determined. According to different embodiments, in order to measure the loads that result in different tensile stress for the different anchor bolts in all directions of the horizontal plane at the foundation, at least three load measuring units are provided. As shown in FIG. 3, four or more load measuring sensors can be provided at opposing and perpendicular sides of the foundation, respectively.

Figure 4:
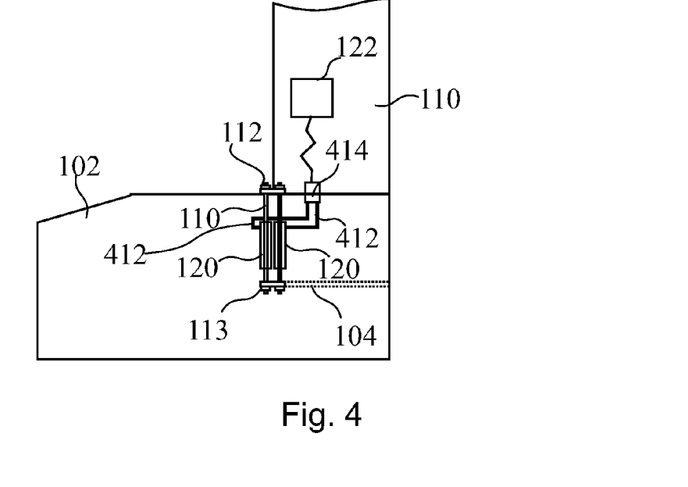
FIG. 4 shows a schematic diagram illustrating a foundation having anchor bolts and anchor bolt tensile stress measuring equipment with wiring connected to a plug according to embodiments described herein.

FIG. 4 shows a portion of a foundation 100 having a foundation body 102 on which a structure 20 is provided. Within the foundation body 102, an anchor plate 104, for example, in the form of the anchor ring, is embedded and anchor bolts 110 being fixed to the anchor plate 104 by, for example, nuts 113 extending from the anchor plate 104 to the lower end of the structure 20. The structure 20 is fixed to the anchor bolts and, thus, to the foundation by nuts 112. According to further embodiments, which can be combined with other embodiments described herein, the load measuring sensors 120 are connected by wires 412 to a plug 414, which is accessible from the outside of the foundation in order to connect the load measuring sensor 120 to a measuring electronic 122. Thereby, according to embodiments described herein, only passive elements like the magnetically encoded rod or bolt and the magnetic field sensor, which can include coils, is embedded in the foundation. Accordingly, loads from the concrete, humidity or other influences are not subject to active electronic devices. The magnetic field sensor can be provided by passive elements like coils. Thereby, the sensor signal processing is activated when measurements are being performed, i.e., when an external plug (with power supply) is connected.

According to yet further embodiments, the wires 412 can have a length of up to 1 m or 2 m. Thereby, the plug 414 can be installed such that there is access at the upper portion of the foundation 100. In the case of the tower of a wind turbine mounted on the foundation, the plug 414 can for example be installed within the hollow tower of the wind turbine. According to yet further embodiments, the magnetic field sensor might be equipped with a transmitter for wireless transfer of the signals, such as wireless inductively powered ICs or components for an RF-ID type communication. Thereby, wires in the concrete might be omitted.

The ability to measure the tensile stress in the anchor bolts or tensioning bolts of a concrete foundation by providing a permanent access to measurement results, according to embodiments described herein, allows for several options. The tensioning load on the anchor bolts can be monitored while tightening a lower portion of the structure to the foundation. The continuous or regular monitoring of the tensile stress allows for improving the foundation and can eliminate the necessity for large quantities of steel bars, rebars or tension bars and may substantially reduce the amount of concrete required. The continuous or regular monitoring of the tensile stress of the anchor bolts allows detection of potential problems that might occur in the structure at an early time. Such problems can, for example, be asymmetrical loads in the foundation, unexpected changes of the loads over time and/or detection of failures in the reinforcing structure of the foundation. A simple and direct measurement of the foundation load distribution can further provide information on the operation conditions of the structure like a wind turbine, both in the dynamic case and in the case where the structure is built up but not operated. Furthermore, a long-term stability for tensile stress in the foundation can be provided for maintenance and the like. Even more, gathering information about the actual stress in the bolt may help to utilize the bolts to their full tensile force capability and can be indicative to whether or not the bolt transmitting tension forces to the concrete above the anchor plate.

Figure 5:
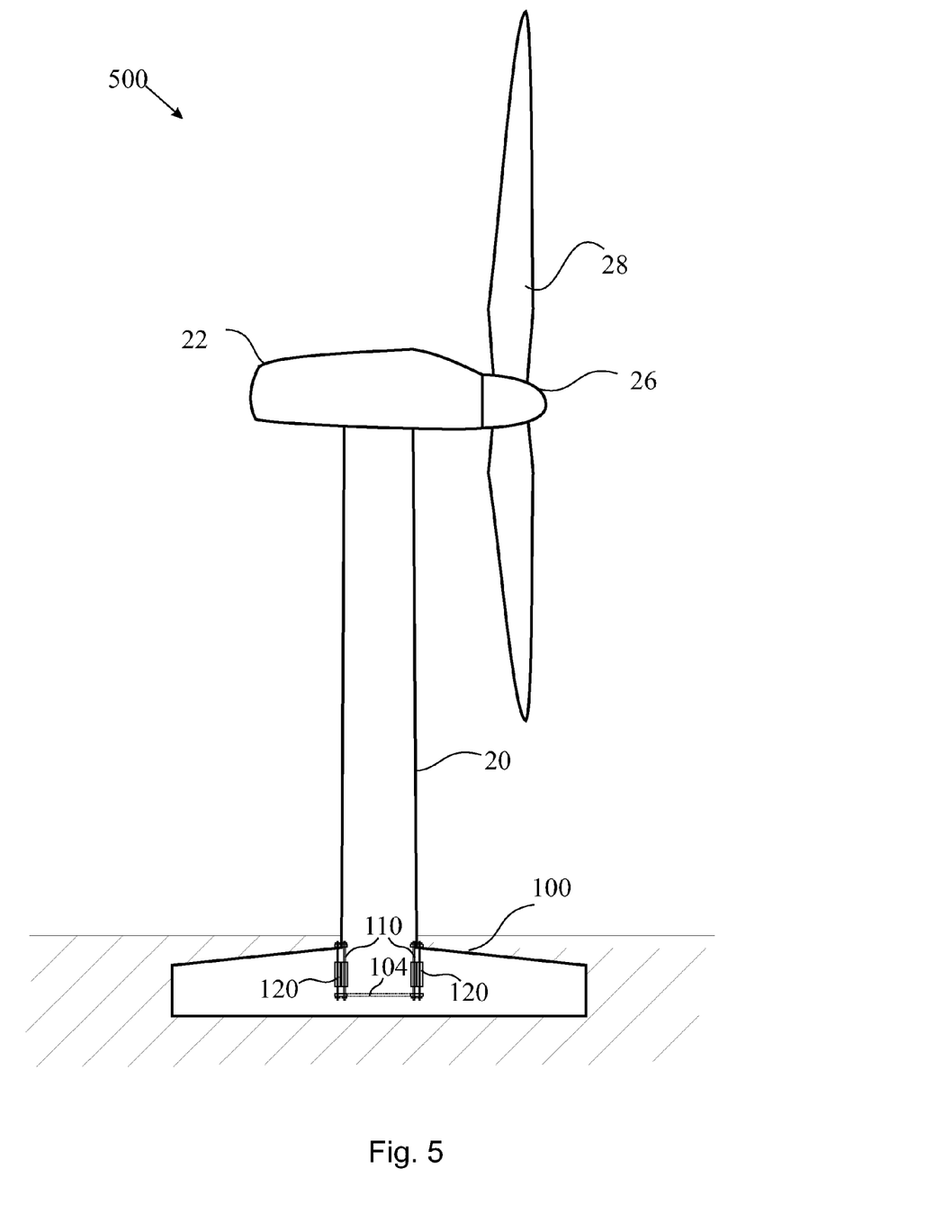
FIG. 5 shows a schematic diagram illustrating a wind turbine having a foundation with anchor bolts and anchor bolt tensile stress measuring equipment according to embodiments described herein.

The foundations according to embodiments described herein can be used for structures or towers that can be used for power lines, communications systems, street lighting, street signals, bridge supports, commercial signs, freeway signs, ski lifts or wind turbines. FIG. 5 shows an example of a wind turbine 500 including a foundation 100. The tower 20 of the wind turbine 500 is supported by the foundation 100 and fixed to anchor bolts 110 extending from an anchor plate 104. The loads at one or more positions on the foundation or within one or more anchor bolts 110 can be monitored by load measuring units according to embodiments described herein. FIG. 5 illustrates four load measuring units 120. On top of the tower 20, a nacelle 22 is provided. The nacelle 22 carries the hub 26 on which the rotor blades 28 are mounted.

Figure 6:
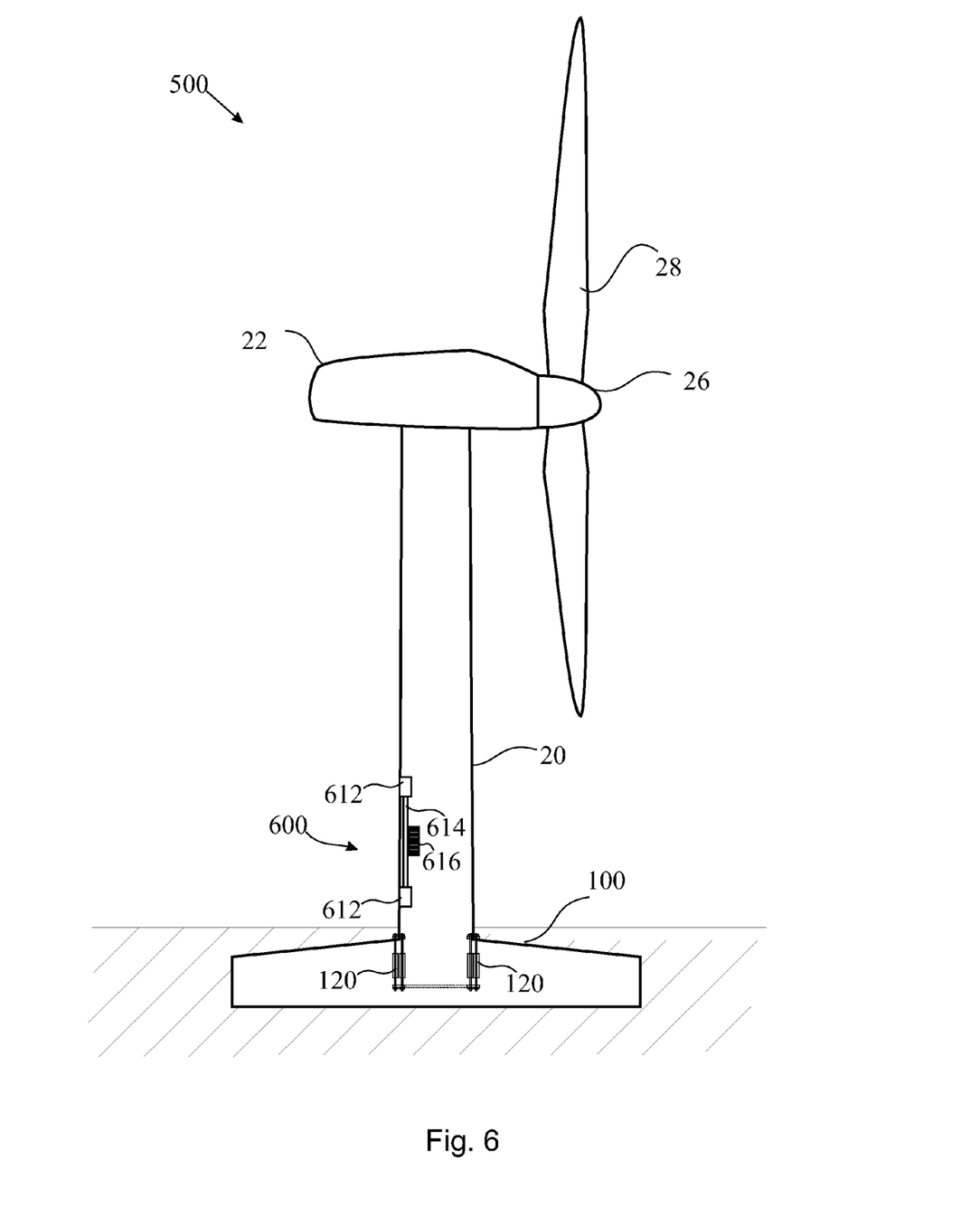
FIG. 6 shows a schematic diagram illustrating a wind turbine having a foundation with anchor bolts and anchor bolt tensile stress measuring equipment according to embodiments described herein and further load measuring equipment, exemplarily in the tower of the wind turbine according to embodiments described herein.

A modified embodiment of a wind turbine 500 is shown in FIG. 6. Additionally to the elements described above, a load measuring unit 600 is provided within the tower 20 of the wind turbine 500. Similarly to the load measuring unit described with respect to FIG. 2, a load measuring unit 600 includes a magnetically encoded rod 614 and the magnetic field sensor 616. According to different embodiments, the magnetically encoded rod 614 can be mounted to the tower wall at two fixed positions with mounting elements 612. According to even further different embodiments, the mounting elements 612 can be welded to the tower wall, glued to the tower wall, screwed to the tower wall or the like. Loads acting on the tower 20 of the wind turbine 500 transferred compressive or tensile stress on the magnetically encoded rod 614. Accordingly, a load measurement of the tower can be provided by one or more, for example, four load measuring sensors 600.

According to yet further embodiments, which can be combined with other embodiments described herein, load measuring unit 600 can be provided at different heights within the tower or at other structural elements of the wind turbine 500, e.g., the nacelle, the hub, the rotor blades, or the like. Thereby, the load measuring unit can easily be installed in existing wind turbines or after manufacturing of a wind turbine. The measuring system, which is added with the mounting elements can be provided on the wind turbine at any time and does not need to be integrated in the wind turbine during installation thereof.

According to even further embodiments, additionally or alternatively to providing a rod 614 as shown in FIG. 6, a portion of the wall of the tower or another component could be magnetically encoded for measuring compressive and/or tensile stress in the tower or the like.

According to yet further embodiments, similar load measurements can also be applied for other applications than wind turbines. Further, the load measuring unit 600 can be applied irrespective of the kind of foundation used. That is, the load measuring units may also be provided if a foundation without a load measuring unit supports the wind turbine.

Figure 7:
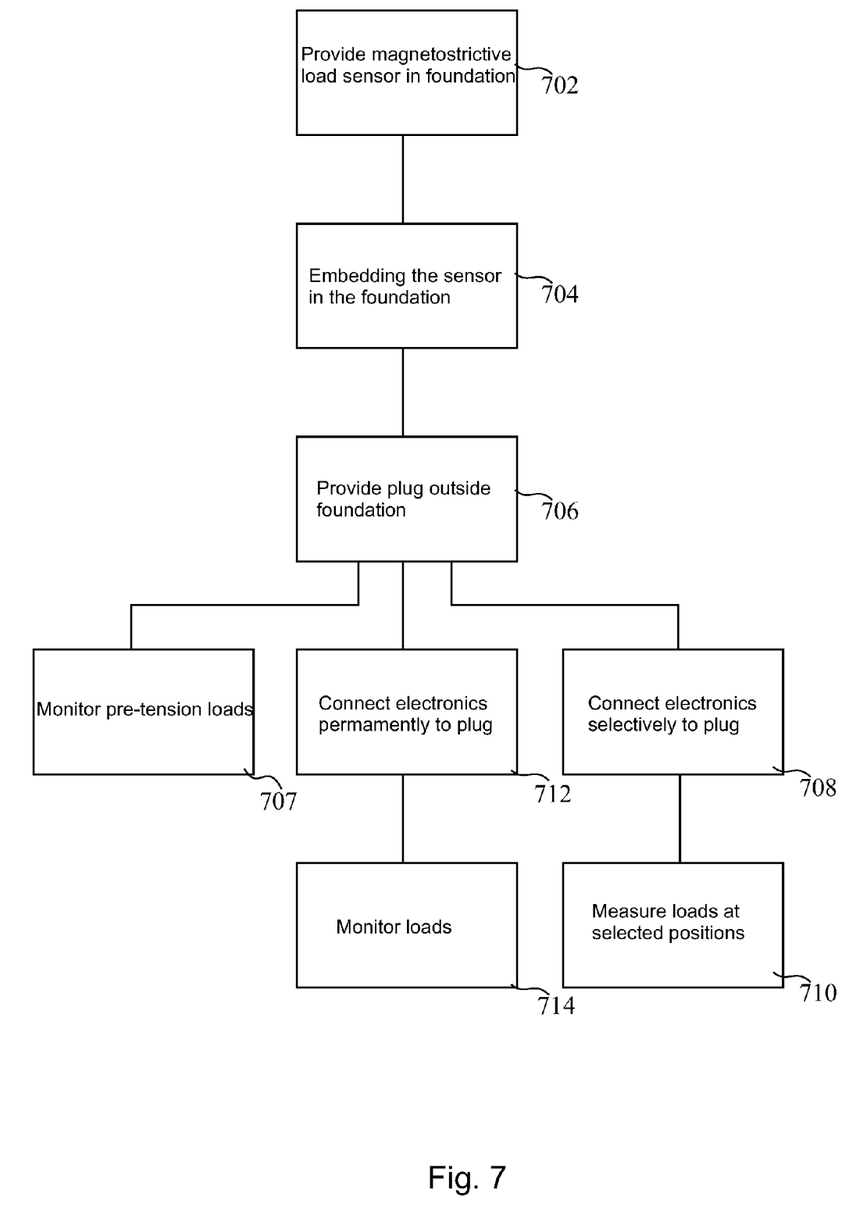
FIG. 7 shows a flow chart illustrating an alternative method of measuring tensile stress in a foundation anchor bolt according to embodiments described herein.

Different embodiments of methods for measuring loads in a foundation will now be described with respect to FIG. 7. In step 702 the magnetostrictive measuring sensor is provided in the foundation before the foundation body is filled with concrete or the like. In step 704 the foundation is filled, whereby the load measuring sensor is embedded in the foundation. In step 706 a plug for wiring the magnetic field sensor of the load measuring sensor outside the foundation is provided. Accordingly, a drift resistance measurement of tensile stress in anchor bolts of the foundation can be provided continuously or on a regular basis. Thereby, according to some embodiments, only passive sensor elements are embedded in the foundation.

The one or more magnetostrictive load measuring sensors can, according to step 707, be used for monitoring the pre-tension load during building of the structure on the foundation. Providing a precise monitoring of pre-tension loads allows for detection of changes in the pre-tension of the anchor bolts during building up of the structure or, at a later time, during the lifetime of the structure.

According to a further, alternative or additional embodiment, a measurement electronic can be connected to the plug for measurement of the tensile stress in the anchor bolts in step 708. This can for example be done during maintenance of the structure, e.g. a wind turbine. Thereby, in step 710, precise measurements of the tensile stress in the anchor bolts can be conducted on a weekly, monthly or yearly basis. In light of the small drift of the load measuring unit, changes in the loads of the anchor bolts can be detected. Thereby one active electronic measurement device can be used for measurements at different positions. Countermeasures can be taken if undesirable measurement results are detected.

According to yet further embodiments, alternatively or additionally, active measurement electronics can be permanently provided outside a foundation for continuously or quasi-continuously monitoring tensile stress on the anchor bolts. For example, tensile stress values at one or more positions of the foundation can be monitored on the basis of seconds, minutes or hours (e.g., every 1 s, every 1 min, or every 1 h). Such signals might provide feedback for a control unit of the entire structure. If, for example, a wind turbine is operated, a feedback might be provided to the control unit of the wind turbine. Thereby, load variations due to control of different elements of the wind turbine can result in a direct feedback to the control unit.

As described above, according to different embodiments, the tensile stress load measurements of the structure like a wind turbine can be considered for two different conditions. The loads on the foundation can be measured during operation of the wind turbine or the wind turbine can be stopped such that the loads on the foundation can be measured under a stationary condition.

According to different embodiments described herein a foundation for supporting a structure is provided. The foundation may include a foundation body, at least one anchor bolt connecting a lower anchor plate and the structure, and a magnetostrictive load measuring sensor for measuring loads on the at least one anchor bolt, the magnetostrictive load measuring sensor being positioned within the foundation body. According to different optional designs the magnetostrictive load measuring sensor can include a magnetic field sensor positioned adjacent to the at least one anchor bolt or, alternatively or additionally the magnetostrictive load measuring sensor can include at least one magnetically encoded steel rod connected to the at least one anchor bolt, wherein the length of the at least one magnetically encoded steel rod extends in the direction of the length of at least one anchor bolt and a magnetic field sensor positioned adjacent to the at least one magnetically encoded steel rod.

According to yet further embodiments, which may yield by a combination with any of the other embodiments, the portion of the magnetic field sensor being embedded in the foundation body consists of passive elements. In this case, typically a power supply being external of the foundation body is connected to the magnetic field sensor.

Thereby, according to even further embodiments it is possible that the at least one magnetically encoded steel rod is fixedly connected to a first position of the at least one tensioning bolt and a second position of the at least one anchor bolt. According to yet further typical embodiments, the at least one magnetically encoded steel rod can be fixedly connected to the first position by fixing the at least one magnetically encoded steel rod to a first nut provided on the at least one tensioning bolt and can be fixedly connected to the second position by fixing the at least one magnetically encoded steel rod to a second nut provided on the at least one tensioning bolt. As a further alternative or additional modification, at least two magnetically encoded steel rods can be provided for each of the at least one anchor bolts, and at least one magnetic field sensor is positioned adjacent to each of the at least two magnetically encoded steel rods.

According to typical embodiments, which can be combined with any of the embodiments described herein, at least 36 anchor bolts can be provided. As a further optional element at least three anchor bolts of the at least 36 anchor bolts can be equipped with the load measuring sensor.

According to even further embodiments, which can be combined with any of the embodiments described herein, anchor bolts at four sides of the foundation can be equipped with a load measuring sensor, wherein two of the four sides, respectively, oppose each other. According to yet even further embodiments, which can be combined with any of the embodiments described herein, the magnetostrictive load measuring sensor is adapted to measure tensile stress in the at least one anchor bolt.

According to other embodiments, which can be combined with any of the embodiments described herein, a plug for terminating a wire connected to the magnetostrictive load measuring sensor can be provided, the plug being positioned outside of the foundation for signal access. Alternatively or additionally, a housing for the load measuring unit which is adapted to allow movement of the load measuring unit in the foundation body can be provided.

According to some embodiments, a wind turbine having a foundation according to any of the embodiments described herein can be provided. Thereby, it is as an example possible that a plug for terminating a wire connected to the measuring sensor is provided, the plug being positioned outside of the foundation for signal access within the tower.

According to some embodiments, which can be combined with any of the embodiments described herein, a wind turbine is provided. The wind turbine can include at least one structural component of the group consisting of: a tower, a nacelle supported by the tower, a hub connected to the nacelle, and at least one rotor blade connected to the hub, wherein at least one magnetically encoded steel rod is connected to the at least one of the structural components, wherein the at least one magnetically encoded steel rod is fixedly connected to a first position of the at least one structural component and a second position of the at least one structural component, and a magnetic field sensor positioned adjacent to the at least one magnetically encoded steel rod. According to one embodiment, the structural component can be the tower and the at least one magnetically encoded steel rod extends adjacent to a wall of the tower. According to another embodiment, optionally a foundation according to any of the embodiments described herein can be provided.

According to yet further embodiments, a method of measuring tensile stress in a foundation anchor bolt is provided. The method includes embedding a magnetostrictive load sensor in the foundation, providing a plug for external access to the signal wiring of the magnetostrictive load sensor, connecting a measuring electronics to the plug, and measuring the tensile stress of the anchor bolt. According to additional options the measuring can be conducted continuously or quasi-continuously and/or regularly on a weekly, monthly or yearly basis. Thereby, as an example, the measuring electronic can be consecutively connected to more than one plug. According to a further embodiment, the measuring can be conducted during tightening of a structure to the foundation and/or manufacturing a structure on the foundation.

Thereby, according to some embodiments, which can be combined with any of the embodiments described herein, the measurement can be used to measure the tension in the bolt during tightening. Thereby, as a further modification, the moment the right pretension is achieved, the tightening process can be stopped.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A foundation for supporting a structure, comprising:
a foundation body;
at least one anchor bolt connecting a lower anchor plate and the structure; and
a magnetostrictive load measuring sensor for measuring loads on the at least one anchor bolt, the magnetostrictive load measuring sensor being positioned within the foundation body.

2. The foundation according to claim 1, wherein the magnetostrictive load measuring sensor comprises:
a magnetic field sensor positioned adjacent to the at least one anchor bolt.

3. The foundation according to claim , wherein the magnetostrictive load measuring sensor comprises:
at least one magnetically encoded steel rod connected to the at least one anchor bolt, wherein the length of the at least one magnetically encoded steel rod extends in the direction of the length of at least one anchor bolt and the at least one magnetically encoded steel rod is fixedly connected to a first position of the at least one tensioning bolt and a second position of the at least one anchor bolt; and
a magnetic field sensor positioned adjacent to the at least one. magnetically encoded steel rod.

4. The foundation according to claim 3, wherein the at least one magnetically encoded steel rod is fixedly connected to the first position by, fixing the at least one magnetically encoded steel rod to a first nut provided on the at least one tensioning bolt and is fixedly connected to the second position by fixing the at least one magnetically encoded steel rod to a second nut provided on the at least one tensioning bolt.

5. The foundation according to claim 3, wherein at least two magnetically encoded steel rods are provided for each of the at least one anchor bolts, and at least one magnetic field sensor is positioned adjacent to each of the at least two magnetically encoded steel rods.

6. The foundation of claim 1, wherein at least three anchor bolts are equipped with the load measuring sensor.

7. The foundation according to claim 1, wherein anchor bolts at four sides of the foundation are equipped with a load measuring sensor, wherein two of the four sides, respectively, oppose each other.

8. The foundation according to claim 1, wherein the magnetostrictive load measuring sensor is configured to measure tensile stress in the at least one anchor bolt.

9. The foundation according to claim 1, further comprising a plug for terminating a wire connected to the magnetostrictive load measuring sensor, the plug being positioned outside of the foundation for signal access.

10. The foundation according to claim 1, further comprising:
a housing for the load measuring unit which is configured to allow movement of the load measuring unit in the foundation body.

11. A Wind turbine comprising:
a foundation body;
at least one anchor bolt connecting a lower anchor plate and the structure;
a magnetostrictive load measuring sensor for measuring loads on the at least one anchor bolt, the magnetostrictive load measuring sensor being positioned within the foundation body; and
a tower supported by the foundation.

12. The wind turbine according to claim 11, wherein a plug for terminating a wire connected to the measuring sensor is provided, the, plug being positioned outside of the foundation for signal access within the tower.

13. A wind turbine comprising:
at least one structural component of the group consisting of: a tower, a nacelle supported by the tower, a hub connected to the nacelle, and at least one rotor blade connected to the hub, wherein a ferromagnetic portion of the structural component is magnetically encoded or at least one magnetically encoded steel rod is connected to the at least one of the structural components such that the at least one magnetically encoded steel rod is fixedly connected to a first position of the at least one structural component and a second position of the at least one structural component; and
a magnetic field sensor positioned adjacent to the at least one magnetically encoded steel rod.

14. The wind turbine according to claim 13, wherein the structural component is the tower and the at least one magnetically encoded steel rod extends adjacent to a wall of the tower.

15. The wind turbine according to claim 13, further comprising:
a foundation body;
at least one anchor bolt connecting a lower anchor plate and the structure; and
a magnetostrictive load measuring sensor for measuring loads on the at least one anchor bolt, the magnetostrictive load measuring sensor being positioned within the foundation body.

16. A method of measuring tensile stress in a foundation anchor bolt, comprising:
embedding a magnetostrictive load sensor in the foundation;
providing a plug for external access to the signal wiring of the magnetostrictive load sensor;
connecting a measuring electronics to the plug; and
measuring the tensile stress of the anchor bolt.

17. The method according to claim 16, wherein the measuring is conducted continuously or quasi-continuously.

18. The method according to claim 16, wherein the measuring is conducted regularly on a weekly, monthly or yearly basis.

19. The method according to claim 16, wherein the measuring electronic is consecutively connected to more than one plug.

20. The method according to claim 16, wherein the measuring is conducted during tightening of a structure to the foundation.

* * * * *

UNITED STATES PATENT AND TRADEMARK OFFICE
CERTIFICATE OF CORRECTION

PATENT NO.         : 8,226,354 B2                                    Page 1 of 1
APPLICATION NO.    : 11/964196
DATED              : July 24, 2012
INVENTOR(S)        : Jacob Johannes Nies et al.

It is certified that error appears in the above-identified patent and that said Letters Patent is hereby corrected as shown below:

In Column 11, Line 18, in Claim 3, delete "claim," and insert -- claim 1, --, therefor.

In Column 11, Line 29, in Claim 3, delete "one." and insert -- one --, therefor.

In Column 11, Line 32, in Claim 4, delete "by," and insert -- by --, therefor.

In Column 12, Line 1, in Claim 11, delete "Wind" and insert -- wind --, therefor.

In Column 12, Line 12, in Claim 12, delete "the, plug" and insert -- the plug --, therefor.

Signed and Sealed this
Twenty-seventh Day of November, 2012

David J. Kappos
*Director of the United States Patent and Trademark Office*

UNITED STATES PATENT AND TRADEMARK OFFICE
CERTIFICATE OF CORRECTION

PATENT NO. : 8,226,354 B2
APPLICATION NO. : 11/964196
DATED : July 24, 2012
INVENTOR(S) : Jacob Johannes Nies et al.

It is certified that error appears in the above-identified patent and that said Letters Patent is hereby corrected as shown below:

In the Claims

In Column 11, Line 23, in Claim 3, delete "of at least one" and insert -- of the at least one --, therefor.

In Column 11, Line 25, in Claim 3, delete "tensioning" and insert -- anchor --, therefor.

In Column 11, Line 33, in Claim 4, delete "tensioning" and insert -- anchor --, therefor.

In Column 11, Line 36, in Claim 4, delete "tensioning" and insert -- anchor --, therefor.

In Column 11, Line 42, in Claim 6, delete "of" and insert -- according to --, therefor.

In Column 11, Line 57, in Claim 10, delete "unit" and insert -- sensor --, therefor.

In Column 11, Line 58, in Claim 10, delete "unit" and insert -- sensor --, therefor.

In Column 12, Line 4, in Claim 11, delete "the structure" and insert -- a structure of the wind turbine --, therefor.

In Column 12, Line 9, in Claim 11, delete "foundation" and insert -- foundation body --, therefor.

In Column 12, Line 36, in Claim 15, delete "structure" and insert -- at least one structural component --, therefor.

Signed and Sealed this
Twenty-seventh Day of May, 2014

Michelle K. Lee
*Deputy Director of the United States Patent and Trademark Office*